United States Patent
Markov

(10) Patent No.: US 8,020,161 B2
(45) Date of Patent: Sep. 13, 2011

(54) METHOD AND SYSTEM FOR THE DYNAMIC SCHEDULING OF A STREAM OF COMPUTING JOBS BASED ON PRIORITY AND TRIGGER THRESHOLD

(75) Inventor: Lev Markov, Wayland, MA (US)

(73) Assignee: Oracle America, Inc., Redwood City, CA (US)

(*) Notice: Subject to any disclaimer, the term of this patent is extended or adjusted under 35 U.S.C. 154(b) by 1401 days.

(21) Appl. No.: 11/520,477

(22) Filed: Sep. 12, 2006

(65) Prior Publication Data

US 2008/0066070 A1     Mar. 13, 2008

(51) Int. Cl.
G06F 9/46     (2006.01)
(52) U.S. Cl. .......................... 718/103; 718/104
(58) Field of Classification Search .................... 718/103
See application file for complete search history.

(56) References Cited

U.S. PATENT DOCUMENTS

| | | | |
|---|---|---|---|
| 6,430,593 B1* | 8/2002 | Lindsley | 718/103 |
| 6,584,488 B1* | 6/2003 | Brenner et al. | 718/103 |
| 6,651,081 B1* | 11/2003 | Salgado et al. | 718/103 |
| 7,496,928 B2* | 2/2009 | Fuller | 719/319 |
| 7,657,892 B2* | 2/2010 | Langen et al. | 718/102 |
| 2002/0083117 A1* | 6/2002 | Goddard | 709/103 |
| 2003/0208521 A1* | 11/2003 | Brenner et al. | 709/103 |
| 2005/0050550 A1* | 3/2005 | Fuller | 719/319 |
| 2006/0288346 A1* | 12/2006 | Santos et al. | 718/102 |

OTHER PUBLICATIONS

Lev Markov, "Two Stage Optimization of Job Scheduling and Assignment in Herterogeneous Computer Farms", IEEE, 2004, p. 1-6.*

Bulhoes, P., Byun, C., Castrapel, R., Hassaine, O. "N1™ Grid Engine 6 Feature and Capabilities", 2004, 11 pages.

Ernemann, C., Hamscher, V., Schwiegelshohn, U., Yahyapour, R., "On Advantages of Grid Computing for Parallel Job Scheduling", Computer Engineering Institute University Dortmund, Germany, 2002 (8 pages).

Krallmann, J., Schwiegelshohn, U., Yahyapour, R., "On the Design and Evaluation of Job Scheduling Algorithms", Computer of Engineering Institute University Dortmund, Germany, (25 pages).

Feitelson, D.G., Rudolph, L., Schweigelshohn, U., Sevick, K.C., Wong, P. "Theory and practice in Parallel Job Scheduling". In Job Scheduling Strategies for Parallel Processing, pp. 1-34, 1997.

Markov, L.; "Graph Optimization Algorithms for Sun Grid Engine"; 2nd Grid Engine Workshop; http://gridengine.sunsource.net/download/workshop22-24_09_03/SMI_Lev_Markov_GraphOptimizationAlgorithms.pdf; P18; Sep. 2003.

* cited by examiner

*Primary Examiner* — Jennifer N. To
(74) *Attorney, Agent, or Firm* — Osha • Liang LLP

(57) ABSTRACT

A method of executing jobs includes obtaining a first plurality of scheduled jobs, setting a first trigger threshold based on at least one of the first plurality of scheduled jobs, executing the first plurality of scheduled jobs, receiving a submitted job during the execution of the first plurality of scheduled jobs, associating the submitted job with a submitted job priority, if the submitted job priority satisfies the first trigger threshold, obtaining a second plurality of scheduled jobs, setting a second trigger threshold based on at least one of the second plurality of scheduled jobs, executing the second plurality of scheduled jobs, and if the submitted job priority does not satisfy the first trigger threshold, continuing execution of the first plurality of jobs.

14 Claims, 7 Drawing Sheets

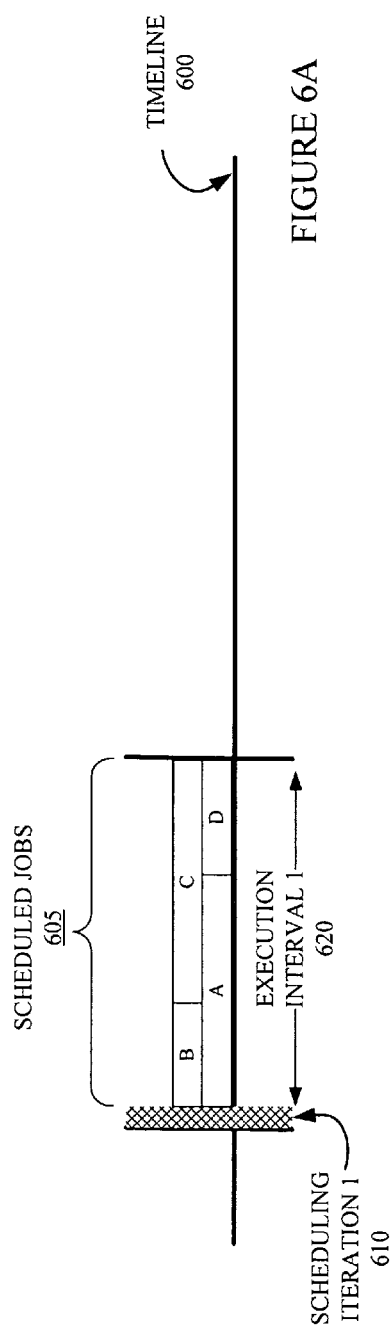
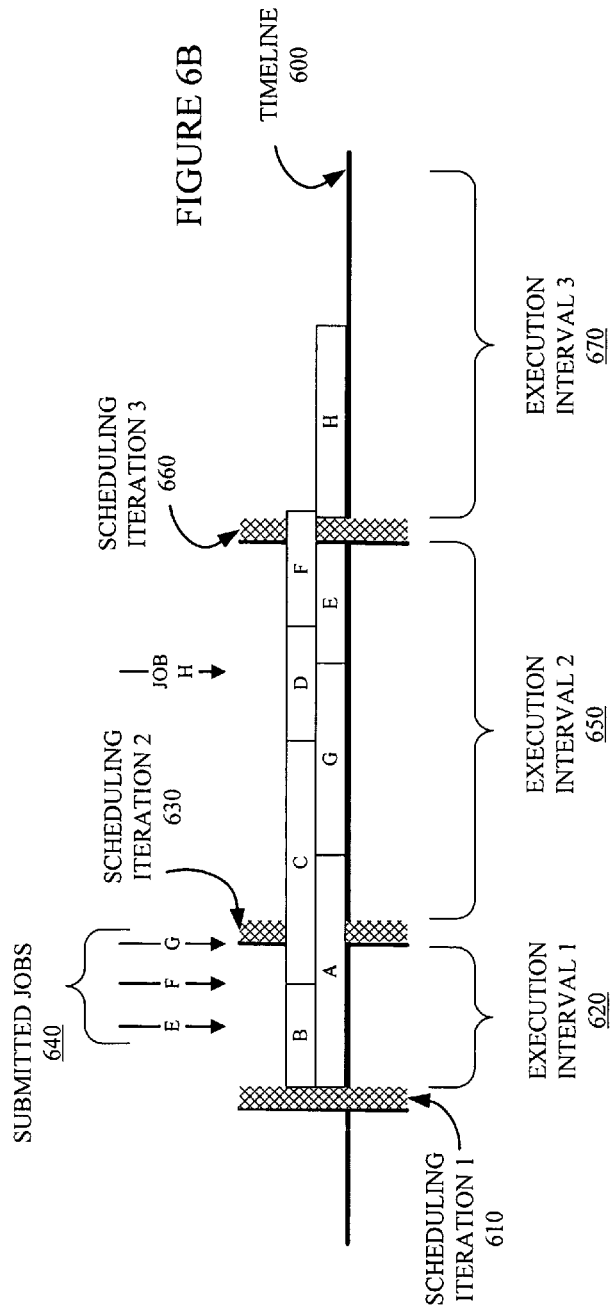

METHOD AND SYSTEM FOR THE DYNAMIC SCHEDULING OF A STREAM OF COMPUTING JOBS BASED ON PRIORITY AND TRIGGER THRESHOLD

CROSS-REFERENCE TO RELATED APPLICATIONS

The present application contains subject matter that may be related to the subject matter in the following U.S. patents filed on May 13, 2005, invented by Lev Markov, and assigned to the assignee of the present application: U.S. Pat. No. 7,743,378 entitled "Method and Apparatus for Multidimensional Priority Determination for Job Scheduling"; U.S. application Ser. No. 11/128,725 entitled "Method and Apparatus for Job Assignment and Scheduling Using Advance Registration, Backfilling and Preemption"; U.S. Pat. No. 7,752,622 entitled "Method and Apparatus for Flexible Job Pre-emption"; U.S. Pat. No. 7,844,968 entitled "System for predicting earliest completion time and using static priority having initial priority and static urgency for job scheduling". All mentioned U.S. applications are hereby incorporated by reference.

BACKGROUND

Job scheduling addresses the allocation of resources to jobs over time. The one or more jobs to be scheduled for execution on the resources may be known in advance, or such jobs may be submitted on an ongoing basis. Each job may have different demands such as required memory, required processor speed, required licenses, required completion time, etc. The resources available to execute each job may include one or more machines with one or more processors (e.g., personal computers, mainframes, servers, grid clusters, PDAs, mobile phones, storage devices, etc.). Multiple resources may be connected via a network (e.g., the Internet) with wired and/or wireless segments. Further, the quantity and type of available resources may change over time as new resources are added and existing resources become unavailable (e.g., removed for service, removed for power conservation, resource failure, etc.).

In view of the above, job scheduling is the task of deciding which jobs should be executed by which resources, and in what order. The decision process may occur once, or may be repeated as new jobs are submitted, and/or resources change (e.g., resources become more plentiful, suffer a depletion, etc.). Job scheduling has been studied extensively in many varieties and in many viewpoints. Many mathematical models have been created to study different scenarios in job scheduling.

SUMMARY

In general, in one aspect, the invention relates to a method of executing jobs. The method comprises obtaining a first plurality of scheduled jobs, setting a first trigger threshold based on at least one of the first plurality of scheduled jobs, executing the first plurality of scheduled jobs, receiving a submitted job during the execution of the first plurality of scheduled jobs, associating the submitted job with a submitted job priority, if the submitted job priority satisfies the first trigger threshold: obtaining a second plurality of scheduled jobs, setting a second trigger threshold based on at least one of the second plurality of scheduled jobs, executing the second plurality of scheduled jobs, and if the submitted job priority does not satisfy the first trigger threshold: continuing execution of the first plurality of jobs.

In general, in one aspect, the invention relates to a computer readable medium. The computer readable medium stores instructions to execute jobs, the instructions comprising functionality to: obtain a first plurality of scheduled jobs, set a first trigger threshold based on at least one of the first plurality of scheduled jobs, execute the first plurality of scheduled jobs, receive a submitted job during the execution of the first plurality of scheduled jobs, associate the submitted job with a submitted job priority, if the submitted job priority satisfies the first trigger threshold: obtain a second plurality of scheduled jobs, set a second trigger threshold based on at least one of the second plurality of scheduled jobs, execute the second plurality of scheduled jobs, and if the submitted job priority does not satisfy the first trigger threshold: continue execution of the first plurality of jobs.

In general, in one aspect, the invention relates to a system for executing jobs. The system comprises a plurality of resources configured to execute a first plurality of jobs, a priority generator configured to assign a priority to a newly submitted job, and a scheduler configured to schedule a second plurality of jobs for execution on the plurality of resources based on the priority of the newly submitted job.

Other aspects of the invention will be apparent from the following description and the appended claims.

BRIEF DESCRIPTION OF DRAWINGS

FIG. 6A and FIG. 6B show an example timeline in accordance with one or more embodiments of the invention.

DETAILED DESCRIPTION

Figure 1:
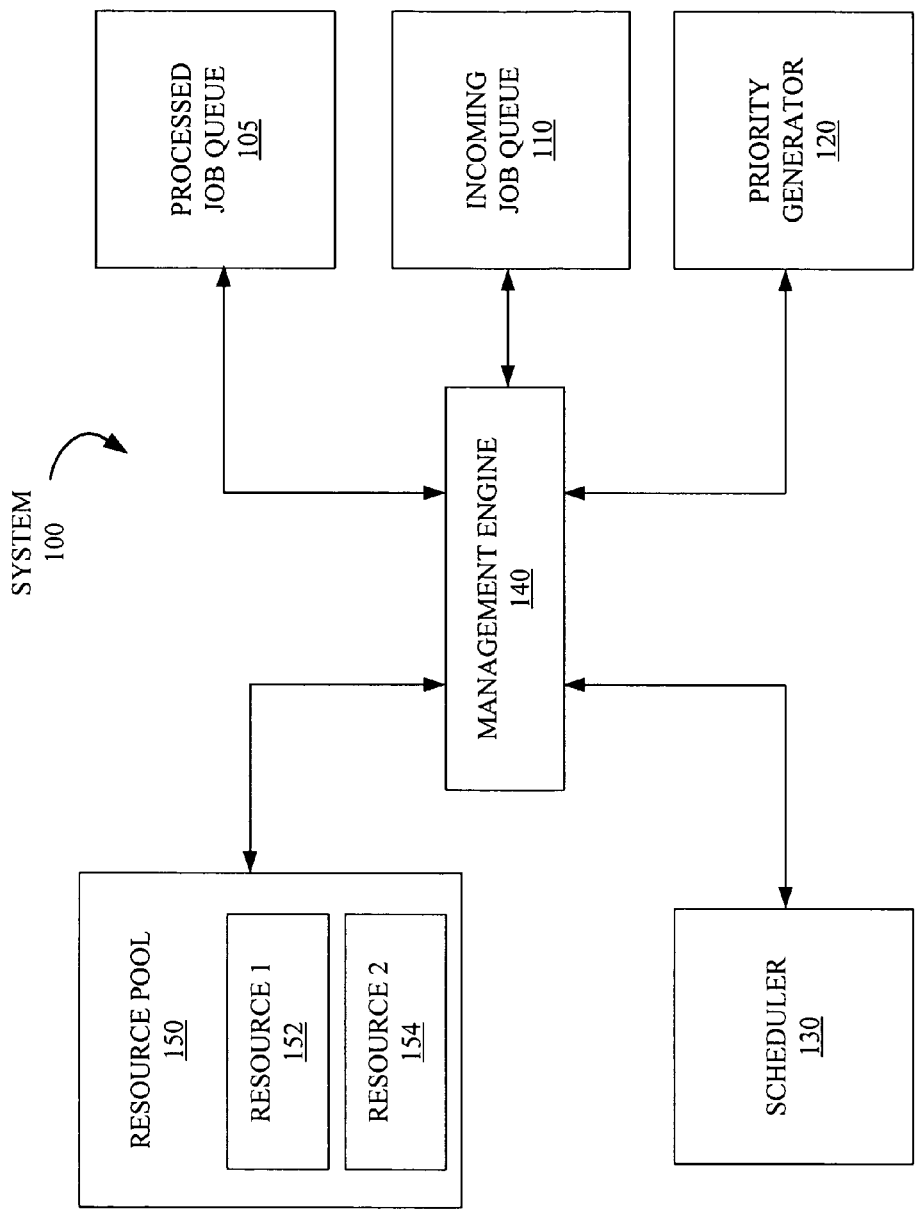
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to dynamically schedule submitted jobs. In general, embodiments of the invention provide a system and method to dynamically schedule submitted jobs using a trigger threshold and priority values.

FIG. 1 shows a system (System (100)) in accordance with one or more embodiments of the invention. As shown in FIG. 1, System (100) includes numerous components, such as a management engine (Management Engine (140)), a scheduler (Scheduler (130)), a priority generator (Priority Generator (120)), a resource pool (Resource Pool (150)) with one or more resources (Resource 1 (152), Resource 2 (154)), and one or more job queues (Incoming Job Queue (110), Processed Job Queue (105)). Each of these components are described below and may be located on the same device (e.g., a server, mainframe, desktop PC, laptop, PDA, telephone, mobile phone, grid cluster, etc.) or may be located on separate devices connected by a network (e.g., the Internet), with wired and/or wireless segments.

In one or more embodiments of the invention, Incoming Job Queue (110) may store jobs that have been submitted to System (100) for execution. The submitted jobs may originate from any source or user. Jobs may be submitted to System (100) in any order and at any time. Jobs placed in Incoming Job Queue (110) may run interactively or in batch mode.

In one or more embodiments of the invention, Priority Generator (120) may be used to assign a priority to each of the submitted jobs stored in Incoming Job Queue (110). When prioritizing a job, consideration may be given to the job's existing priority (if any), the time a job has been available for scheduling, and other factors, as appropriate to the system being scheduled, such as dependence on other computing jobs, whether the job is partitionable into two or more executable pieces, preemptability, restartability, and completion deadline. These variables in addition to other weighting and optimization factors that are known in the art may be used to determine the priority of a job. In one or more embodiments of the invention, the priority of a job may be calculated as a static priority as shown in U.S. Pat. No. 7,844,968 entitled "System for predicting earliest completion time and using static priority having initial priority and static urgency for job scheduling," which was previously incorporated by reference.

In one or more embodiments of the invention, Processed Job Queue (105) may be used to store submitted jobs that have been assigned a priority. In other words, a submitted job initially stored in Incoming Job Queue (110) may be relocated to Processed Job Queue (105) after a priority has been assigned to the submitted job (e.g., via Priority Generator (120)). Processed Job Queue (105) may store submitted jobs that have been scheduled for execution and/or submitted jobs that have not been scheduled for execution. The structure of Processed Job Queue (105) may be essentially the same as Incoming Job Queue (110).

In one or more embodiments of the invention, Resource Pool (150) may include one or more resources (Resource 1 (152), Resource 2 (154), etc.). Each resource in Resource Pool (150) may be a fixed resource (e.g., a CPU, a server, a mainframe, etc.) or a floating resource (e.g., a license). Multiple resources in Resource Pool (150) may be grouped together to form a node (not shown). In one or more embodiments of the invention, a node may be considered a computing entity with various fixed and floating resources available for executing one or more jobs at any given time. A fixed resource may be for the exclusive use of a particular node while a floating resource may be shared between multiple nodes. In one or more embodiments of the invention, all resources and/or nodes in Resource Pool (150) may be linked by a network (e.g., the Internet) with wired and/or wireless segments.

In one or more embodiments of the invention, Scheduler (130) may be used to allocate resources in Resource Pool (150) to fully or partially execute one or more of the prioritized submitted jobs (e.g., jobs stored in Processed Job Queue (105)). Scheduler (130) may have a master schedule (not shown) which is aware of all resources available in the system (i.e., all fixed and floating resources in Resource Pool (150)) and to which job (if any) each resource is allocated at any given time. Schedule (130) may allocate a node or resource to execute a job based on the priority associated with the job and the demands of the job (e.g., required memory, required execution time, required processor speed, required licenses, etc.). Scheduler (130) may also know the expected completion time (e.g., in seconds or cycles) of all running jobs and thus Scheduler (130) may know the future availability of all resources and/or nodes.

In one or more embodiments of the invention, Management Engine (140) may provide one or more interfaces to connect Processed Job Queue (105), Incoming Job Queue (110), Priority Generator (120), Scheduler (130), and Resource Pool (150). Management Engine (140) may also provide a user interface (e.g., a graphical user interface (GUI)) (not shown) to monitor and adjust the operations of Processed Job Queue (105), Incoming Job Queue (110), Priority Generator (120), Scheduler (130), and Resource Pool (150). In one or more embodiments of the invention, Management Engine (140) may be used to interrupt the execution of one or more submitted jobs running on one or more of the resources in Resource Pool (150).

Figure 2:
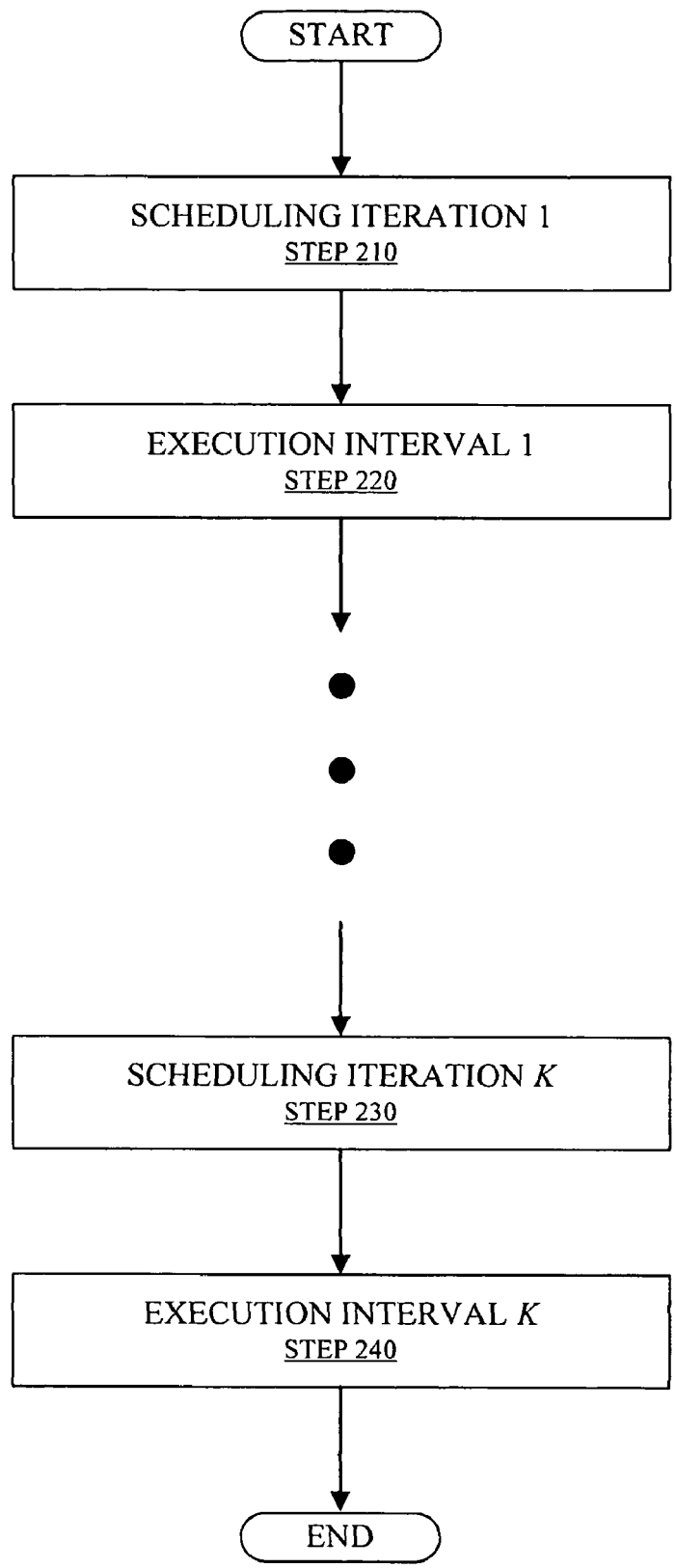
FIGS. 2-5 show flowcharts in accordance with one or more embodiments of the invention.

FIG. 2 is a flowchart in accordance with one or more embodiments of the invention. As shown in FIG. 2, a scheduling iteration (Scheduling Iteration 1 (STEP 210), Scheduling Iteration K (STEP 230)) is followed by an execution interval (Execution Interval 1 (STEP 220), Execution Interval K (STEP 240)). In one or more embodiments of the invention, jobs are scheduled during a scheduling iteration (e.g., Scheduling Iteration 1 (STEP 210), Scheduling Iteration K (STEP 230)) and then executed during an execution interval (e.g., Execution Interval 1 (STEP 220), Execution Interval K (STEP 240)). Any number of scheduling iterations and execution intervals may be used to schedule and execute all the submitted jobs. In other words, K may be any natural number.

In one or more embodiments of the invention, each of the execution intervals (e.g., Execution Interval 1 (STEP 220), Execution Interval K (STEP 240)) may be initially set to be of the same duration. The duration of the execution intervals may be set by a user (not shown). In one or more embodiments of the invention, the transition from an execution interval to the next scheduling iteration may take place because the execution interval duration has lapsed (i.e., execution interval timeout), or a new job with a priority satisfying a trigger threshold is submitted (discussed below).

Figure 3:
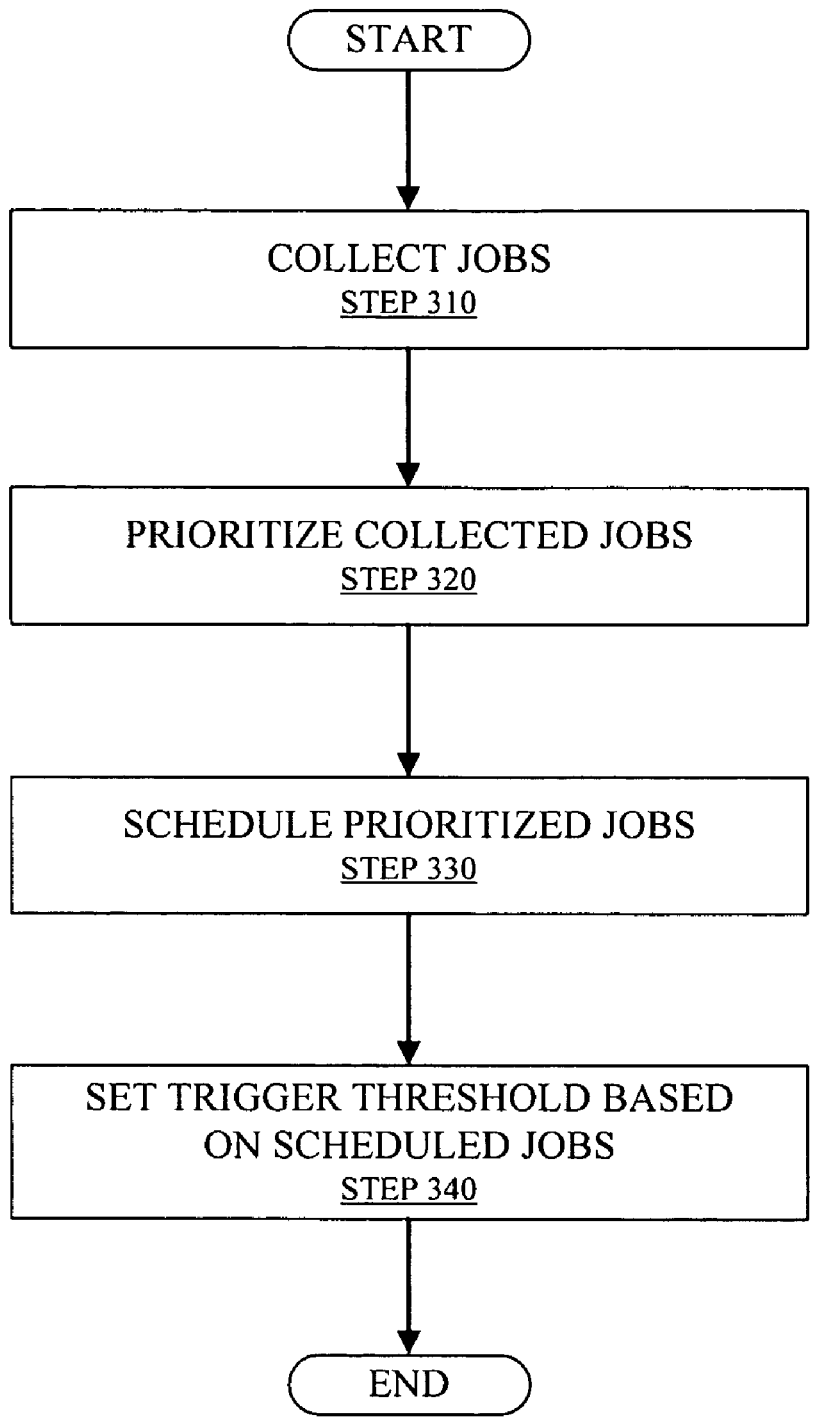

FIG. 3 is a flowchart describing a scheduling iteration (e.g., Scheduling Iteration 1 (STEP 210) in FIG. 2) in accordance with one or more embodiments of the invention. In STEP 310, all jobs are collected for processing. In one or more embodiments of the invention, all jobs includes jobs that were in the process of being executed when the scheduling iteration started (i.e., running jobs), jobs that were scheduled for execution but for which execution has not yet started (i.e., pending jobs), and all jobs that have been submitted but have not yet been scheduled for execution. In one or more embodiments of the invention, jobs that are pending and jobs that have been submitted but have not yet been scheduled for execution may be referred to as non-running jobs.

In STEP 320, all of the collected jobs are prioritized. In one or more embodiments of the invention, jobs with existing priorities may be assigned new priorities. In one or more embodiments of the invention, jobs may be submitted with a priority assigned by the sender. When prioritizing a job, consideration may be given to the job's existing priority (if any), the time a job has been available for scheduling, and other factors, as appropriate to the system being scheduled, such as dependence on other jobs, whether the job is partitionable into two or more executable pieces, preemptability, restartability, and completion deadline. These variables in addition to other weighting and optimization factors that are known in the art may be used to determine the priority of a job. In one or more embodiments of the invention, the priority of a job may be calculated as a static priority as shown in U.S. Pat. No. 7,844,968 entitled "System for predicting earliest completion time and using static priority having initial priority and static urgency for job scheduling," which was previously incorporated by reference. Those skilled in the art, having the benefit of this detailed description, will appreciate prioritizing the collected jobs may generate a ranked list or ordered list of jobs.

Figure 4:
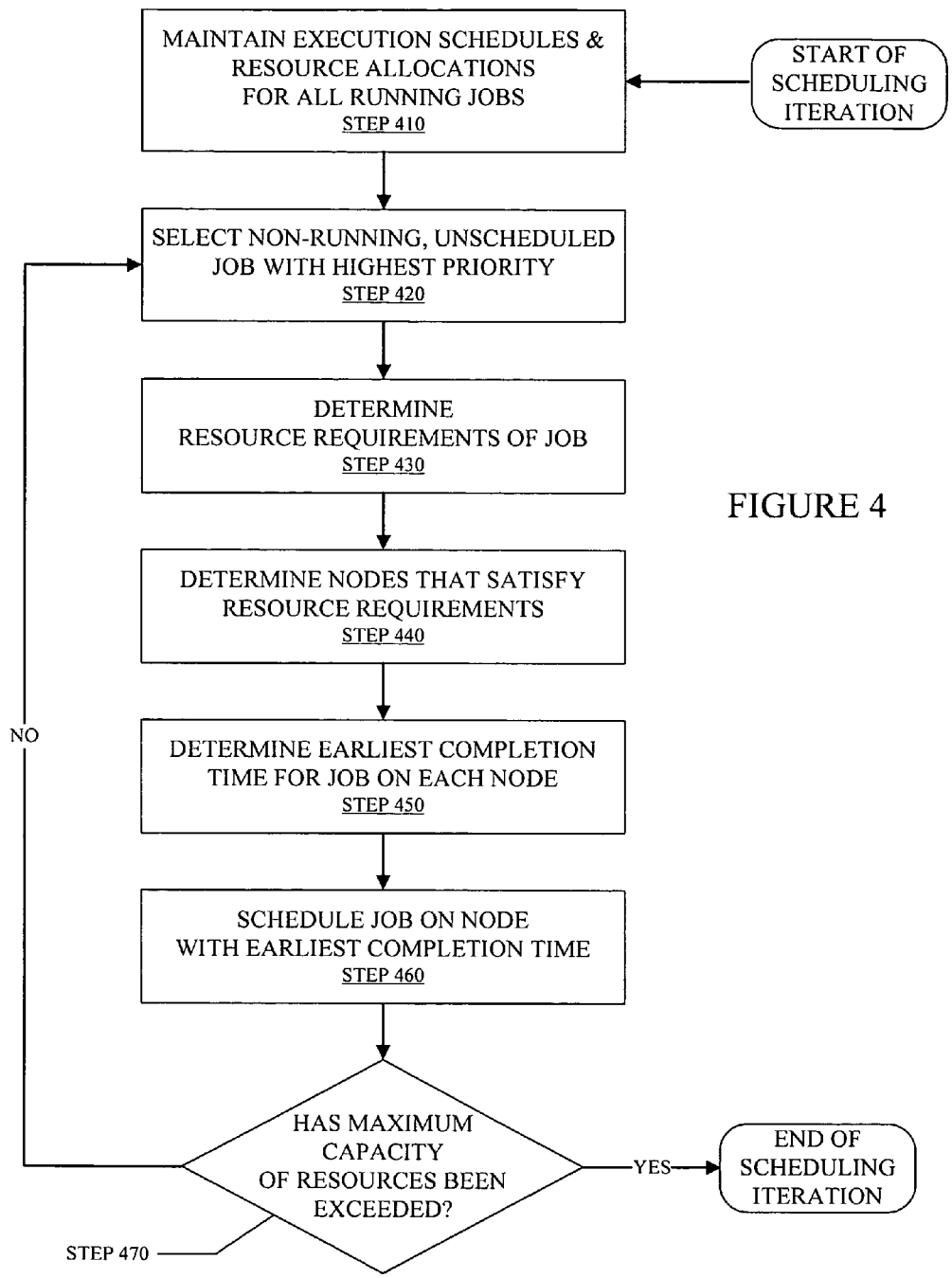

In STEP 330, one or more of the prioritized jobs are scheduled. A detailed description of STEP 330, in accordance with one or more embodiments of the invention, is shown in FIG. 4 (discussed below). After scheduling one or more of the prioritized jobs for execution (STEP 330), a trigger threshold may be determined based on the one or more of the scheduled jobs (STEP 340). In one or more embodiments of the invention, a newly submitted job with a priority meeting or exceeding the trigger threshold may initiate the next scheduling iteration (discussed below). In other words, a newly submitted job with a priority satisfying the trigger threshold will end the current execution interval and force the start of the next scheduling iteration. In one or more embodiments of the invention, the trigger threshold may be a function of the priorities of the one or more scheduled jobs (STEP 330). In one or more embodiments of the invention, the trigger threshold may be a function of the scheduled job with the lowest priority. For example, the trigger threshold may set as twice the lowest priority of the scheduled jobs. In one or more embodiments of the invention, the trigger threshold may be arbitrarily set by a user. In one or more embodiments of the invention, the trigger threshold may vary over an execution interval and may be re-determined following the execution of a scheduled job during an execution interval.

FIG. 4 is a flowchart showing the scheduling process (i.e., a detailed illustration of STEP 330 in FIG. 3) in accordance with one or more embodiments of the present invention. In STEP 410, all running jobs are placed on the schedule (e.g., the master schedule of Scheduler (130) in FIG. 1) in their current positions and continue executing using the same one or more nodes and/or resources previously allocated to them (e.g., by a prior scheduling iteration). In other words, a scheduling iteration does not interrupt a running job. Instead, a scheduling iteration maintains the existing schedules of all running jobs. All non-running jobs are scheduled around the existing schedules of running jobs.

In STEP 420, the non-running, unscheduled job with the highest priority is selected. In STEP 430, the requirements of the selected non-running job are determined. As discussed above, each job may have different demands such as required memory, required processor speed, required processing time, etc. In addition, the non-running job may be associated with a ready time. In one or more embodiments of the invention, the ready time of a job is when all dependencies on other jobs are expected to be satisfied. For example, if the selected job needs results from a previously scheduled job in order to execute, then the ready time for the selected job is no earlier than the time those results are expected to become available.

In STEP 440, the nodes capable of providing the required resources for the selected job (i.e., the suitable nodes) are determined. In STEP 450, the earliest completion time for the selected job on each of the suitable nodes is calculated. This earliest completion time may be determined based on the predicted execution time of the job, the availability of the node, the ready time of the job, and additional considerations known in the art. In one or more embodiments of the invention, determining the earliest completion time may be determined as shown in FIG. 4 of U.S. Pat. No. 7,844,968 entitled "System for predicting earliest completion time and using static priority having initial priority and static urgency for job scheduling," which was previously incorporated by reference.

In STEP 460, the selected job is scheduled to execute on the node resulting in the earliest completion time. In STEP 470, it is determined whether there are any nodes that still have available resources (i.e., resources that have not been allocated to a job). The scheduling of jobs may continue until it is ensured that no resources are idle during the upcoming execution interval. In one or more embodiments of the invention, ensuring no resources are idle during the upcoming execution interval may include scheduling jobs for execution during the entire upcoming execution interval and into the subsequent execution interval. If the possibility of idle resources exists, the process returns to STEP 420. Otherwise, the maximum capacity of the resources for the upcoming execution interval has been met or exceeded, and the scheduling process ends.

Those skilled in the art, having the benefit of this detailed description, will appreciate that one or more jobs (e.g., jobs with low priorities) may not be scheduled. In other words, the maximum capacity of the resources may be met or exceeded before all of the non-running jobs are scheduled. The remaining, unscheduled, non-running jobs may remain in the queue (e.g., Processed Job Queue (105) in FIG. 1) until the next scheduling iteration. Accordingly, the scheduled jobs may be a proper subset of the collected jobs.

Figure 5:
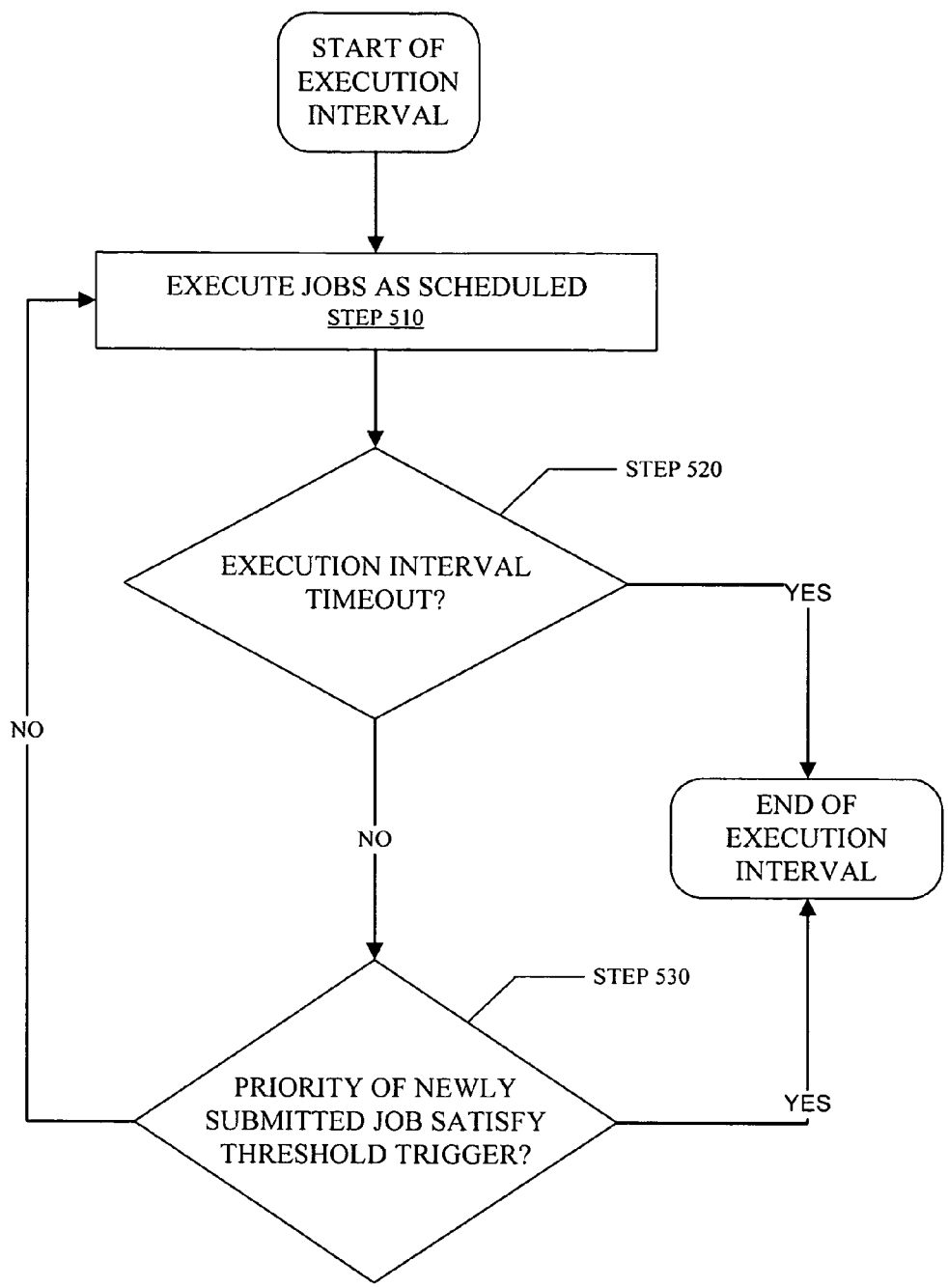

Referring back to FIG. 2, following the completion of a scheduling iteration (e.g., Scheduling Iteration 1 (STEP 210), Scheduling Iteration K (STEP 230)), the process proceeds to the execution interval (e.g., Execution Interval 1 (STEP 220), Execution Interval K (STEP 240)). FIG. 5 is a flowchart showing an execution interval in accordance with one or more embodiments of the invention. In STEP 510, the jobs as scheduled are executed. Then, it is determined whether the execution interval duration has lapsed (i.e., the execution interval has timed out) (STEP 520), or whether a new job with a priority satisfying the trigger threshold has been submitted (STEP 530).

As discussed above, the duration of an execution interval may be set (i.e., fixed) by a user. When the execution interval times out, the next scheduling iteration begins. However, in one or more embodiments of the invention, the fixed execution interval may be prematurely terminated if a newly submitted job has a priority satisfying the trigger threshold. In other words, during an execution interval, new jobs may be submitted. A priority may be calculated for each of the newly submitted jobs as discussed above. If no job is submitted, or if all the submitted jobs have priorities that do not satisfy the trigger threshold, execution continues until the execution interval has timed out. However, if at least one newly submitted job has a priority satisfying the trigger threshold, the current execution interval is terminated prematurely, and the next scheduling iteration is forced to begin.

Consider the following example, which in no way is intended to limit the invention. FIG. 6A and FIG. 6B show an example timeline (Timeline (600)) in accordance with one or more embodiments of the invention. As shown in FIG. 6A, Timeline (600) has a scheduling iteration (Scheduling Iteration 1 (610)), an execution interval (Execution Interval 1 (620)), and multiple jobs scheduled for execution (Scheduled Jobs (605): (A, B, C, D)). The multiple jobs (A, B, C, D) may have been submitted prior to Scheduling Iteration 1 (610). The multiple jobs (A, B, C, D) are scheduled by Scheduling Iteration 1 (610) (e.g., STEP 330 of FIG. 3) for execution during Execution Interval 1 (620). The execution time of each job may be different. For example, the execution time of Job A is longer than the execution time of Job B. Job C is scheduled to execute after Job B. Job D is scheduled to execute after Job A. Job A is scheduled to partially execute in parallel with Job B. Job A is also scheduled to partially execute in parallel with Job C. Job D is scheduled to execute in parallel with Job C. A trigger threshold based on the priority of at least one of Job A, Job B, Job C, and Job D is determined (e.g., STEP 340 of FIG. 3) (not shown).

In FIG. 6B, multiple jobs (Submitted Jobs (640): E, F, G) are submitted during the execution of Job A, Job B, and Job C. Upon submission, each of Submitted Jobs (640): (E, F, G) are assigned a priority. The priority of Job E does not satisfy the trigger threshold. Accordingly, Execution Interval 1 (620) continues following the submission of Job E. The priority of Job F does not satisfy the trigger threshold. Accordingly, Execution Interval 1 (620) continues following the submission of Job F. The priority of Job G does satisfy the trigger threshold. Accordingly, Execution Interval 1 (620) is terminated and Scheduling Iteration 2 (630) begins following the submission of Job G. Scheduling Iteration 2 (630) begins while Job A and Job C are in the process of executing (i.e., Job A and Job C are running jobs). Scheduling Interval 2 (630) begins prior to commencing the execution of scheduled Job D. Accordingly, Job D is a pending job. Job E, Job F, and Job G have not been scheduled and have not started executing. Accordingly, Job D, Job E, Job F, and Job G are all non-running jobs.

In Scheduling Interval 2 (630), all jobs (Job A, Job C, Job D, Job E, Job F, and Job G) are collected and prioritized (e.g., STEP 310 and STEP 320 of FIG. 3). Following the prioritization, one or more of the prioritized jobs are scheduled for execution in the upcoming execution interval (Execution Interval 2 (650)). Running Job A and running Job C are scheduled so as to continue their execution uninterrupted. In other words, Job A and Job C are scheduled as to not interrupt their execution. The remaining non-running jobs are then scheduled by Scheduling Iteration 2 (630) in order of priority. Job D is scheduled to start execution after Job C. Job F is scheduled to start execution after Job D. Job G is scheduled to start execution after Job A. Job E is scheduled to start execution after Job G. A new trigger threshold based on the priority of at least one of Job A, Job B, Job D, Job E, and Job F is determined (e.g., STEP 340 of FIG. 3) (not shown).

Job H is submitted during the execution of Job D and Job G. Upon submission, Job H is assigned a priority. The priority of Job H does not satisfy the new trigger threshold. Accordingly, Execution Interval 2 (650) continues following the submission of Job H. No other jobs are submitted during Execution Interval 2 (650). As discussed above, an execution interval terminate when the priority of a newly submitted job arrives that satisfies the threshold trigger or when the set duration of the execution interval lapses (i.e., execution interval timeout). As shown in FIG. 6B, as no job submitted during Execution Interval 2 (650) has a priority which satisfies the trigger threshold, Execution Interval 2 (650) is terminated when the set duration of the execution interval lapses. When Execution Interval 2 (650) terminates, Scheduling Iteration 3 (660) begins. Scheduling Iteration 3 (660) is essentially the same as Scheduling Iteration 2 (650), except Scheduling Iteration 3 (650) schedules non-running Job H for execution during Execution Interval 3 (670) and schedules running job F to continue executed uninterrupted.

Figure 7:
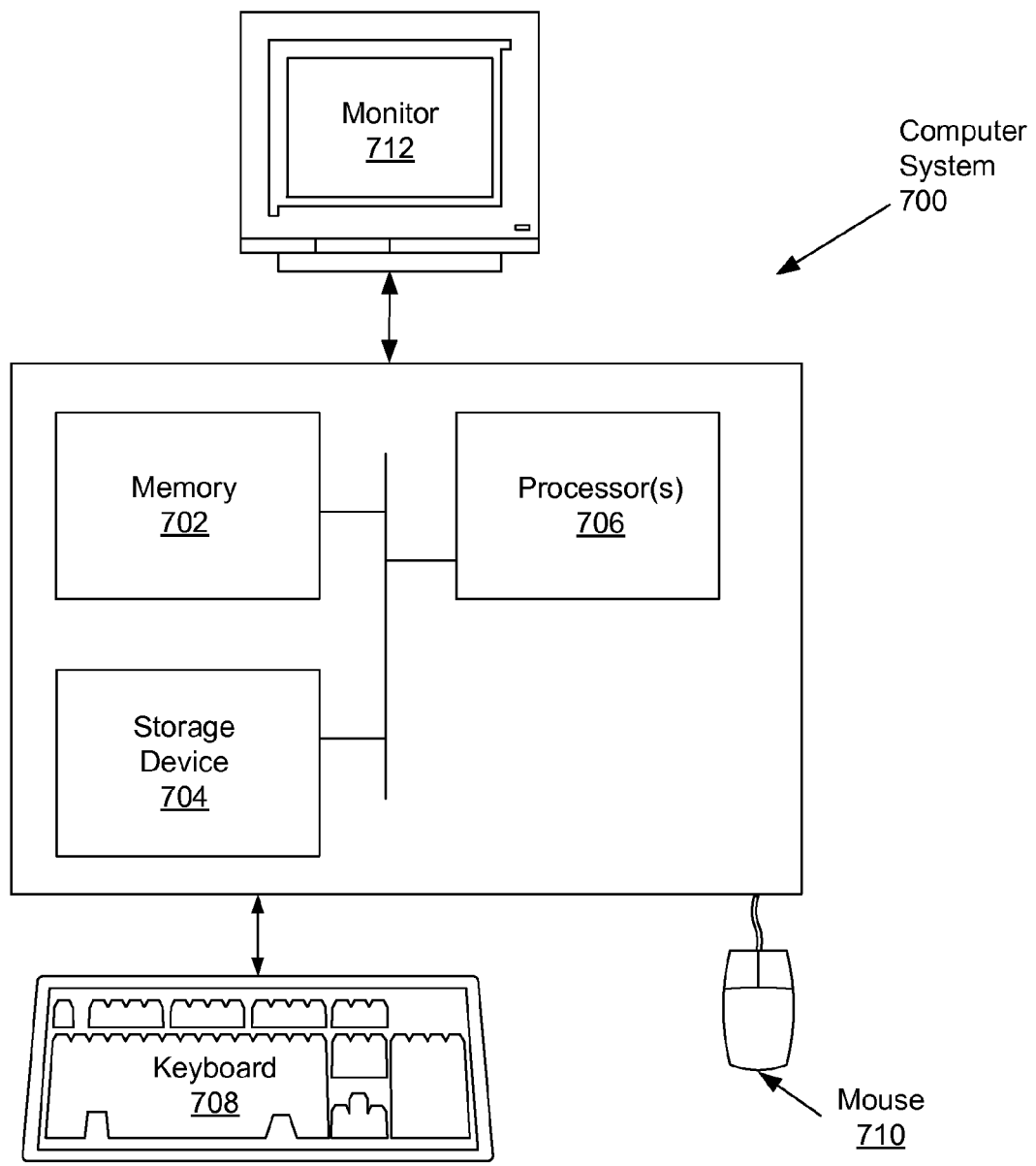
FIG. 7 shows a computer system in accordance with one or more embodiments of the invention.

The invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g., scheduler, management engine, priority generator, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of executing jobs comprising:
    obtaining a first plurality of jobs having a first plurality of priorities;
    generating, by the hardware processor and based on the first plurality of priorities, a first schedule for executing the first plurality of jobs;
    identifying a lowest priority in the first plurality of priorities;
    setting a first trigger threshold to a value exceeding the lowest priority;
    initiating execution of the first plurality of jobs according to the first schedule;
    obtaining a second plurality of jobs having a second plurality of priorities during execution of at least one of the first plurality of scheduled jobs, wherein the second plurality of priorities comprises a priority satisfying the first trigger threshold;
    generating, based on the second plurality of priorities and in response to the priority satisfying the first trigger threshold, a second schedule for executing the second plurality of jobs and a job of the first plurality of jobs;
    setting a second trigger threshold based on at least one of the second plurality of priorities; and
    initiating execution of the second plurality of jobs and the job of the first plurality of jobs according to the second schedule.

2. The method of claim 1, wherein the job of the first plurality of jobs is a pending job.

3. The method of claim 1, wherein the first trigger threshold varies over an execution interval.

4. The method of claim 1, wherein the value equals the lowest priority multiplied by two.

5. The method of claim 1, further comprising:
assigning the first plurality of priorities to the first plurality of jobs based on at least one selected from a group consisting of an existing priority and time since submission.

6. A non-transitory computer readable medium storing instructions to execute jobs, the instructions comprising functionality to:
obtain a first plurality of jobs having a first plurality of priorities;
generate, based on the first plurality of priorities, a first schedule for executing the first plurality of jobs;
identify a lowest priority in the first plurality of priorities;
set a first trigger threshold to a value exceeding the lowest priority;
initiate execution of the first plurality of jobs according to the first schedule;
obtain a second plurality of jobs having a second plurality of priorities during execution of at least one of the first plurality of scheduled jobs, wherein the second plurality of priorities comprises a priority satisfying the first trigger threshold;
generate, based on the second plurality of priorities and in response to the priority satisfying the first trigger threshold, a second schedule for executing the second plurality of jobs and a job of the first plurality of jobs;
set a second trigger threshold based on at least one of the second plurality of priorities; and
initiate execution of the second plurality of jobs and the job of the first plurality of jobs according to the second schedule.

7. The non-transitory computer readable medium of claim 6, wherein generating the second scheduled is further based on at least one selected from the group consisting of an execution interval, a plurality of resources, and a completion time.

8. The non-transitory computer readable medium of claim 6, wherein the instructions further comprise functionality to:
assign the first plurality of priorities to the first plurality of jobs based on at lest one selected from the group consisting of an existing priority and time since submission.

9. The non-transitory computer readable medium of claim 6, wherein the first trigger threshold varies over an execution interval.

10. The non-transitory computer readable medium of claim 6, wherein the at least one job of the first plurality of jobs is a pending job from the first plurality of scheduled jobs.

11. A system for executing jobs comprising:
a hardware processor;
a priority generator configured to assign a first plurality of priorities to a first plurality of jobs and a second plurality of priorities to a second plurality of jobs; and
a scheduler executing on the hardware processor and configured to:
generate, based on the first plurality of priorities, a first schedule for executing the first plurality of jobs;
identify a lowest priority in the first plurality of priorities;
set, before the second plurality of priorities are assigned to the second plurality of jobs, a first trigger threshold to a value exceeding the lowest priority, wherein the second plurality of priorities includes a priority satisfying the first trigger threshold; and
generate, based on the second plurality of priorities and in response to the priority satisfying the first trigger threshold, a second schedule for executing the second plurality of priorities and a job of the first plurality of jobs; and
a plurality of resources configured to execute the first plurality of jobs according to the first schedule and to execute the second plurality of jobs and the job of the first plurality of jobs according to the second schedule.

12. The system of claim 11, wherein the job of the first plurality of jobs is a pending job.

13. The system of claim 11, wherein the first trigger threshold varies over an execution interval.

14. The system of claim 11, wherein the value equals the lowest priority multiplied by two.

* * * * *

UNITED STATES PATENT AND TRADEMARK OFFICE
CERTIFICATE OF CORRECTION

| | | |
|---|---|---|
| PATENT NO. | : 8,020,161 B2 | Page 1 of 1 |
| APPLICATION NO. | : 11/520477 | |
| DATED | : September 13, 2011 | |
| INVENTOR(S) | : Lev Markov | |

It is certified that error appears in the above-identified patent and that said Letters Patent is hereby corrected as shown below:

In Claim 8, Column 9 (line 39), "lest" should be spelled as --least--.

Signed and Sealed this
Eighth Day of November, 2011

David J. Kappos
*Director of the United States Patent and Trademark Office*